(12) United States Patent
Park et al.

(10) Patent No.: US 8,304,111 B2
(45) Date of Patent: Nov. 6, 2012

(54) CATHODE ACTIVE MATERIAL AND SECONDARY BATTERY COMPRISING THE SAME

(75) Inventors: Pil-Kyu Park, Daejeon (KR); Young-Sun Park, Daejeon (KR); Jae-Won Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/303,450

(22) Filed: Nov. 23, 2011

(65) Prior Publication Data

US 2012/0100430 A1    Apr. 26, 2012

Related U.S. Application Data

(63) Continuation of application No. 12/523,392, filed as application No. PCT/KR2008/000305 on Jan. 18, 2008, now Pat. No. 8,084,159.

(30) Foreign Application Priority Data

Jan. 18, 2007 (KR) .......... 10-2007-0005568
Mar. 7, 2007 (KR) .......... 10-2007-0022440

(51) Int. Cl.
*H01M 4/485* (2010.01)
(52) U.S. Cl. .......... 429/221; 429/223
(58) Field of Classification Search .......... 429/221, 429/223, 224, 231.1, 231.8, 231.3, 231.5, 429/231.95; 977/773
See application file for complete search history.

(56) References Cited

U.S. PATENT DOCUMENTS

| | | | |
|---|---|---|---|
| 2004/0253518 A1* | 12/2004 | Hosya et al. | 429/232 |
| 2006/0275667 A1 | 12/2006 | Watanabe et al. | |
| 2007/0166617 A1 | 7/2007 | Gozdz et al. | |

FOREIGN PATENT DOCUMENTS

| | | |
|---|---|---|
| CN | 1663064 A | 8/2005 |
| JP | 2001-110414 A | 4/2001 |
| JP | 2002-279989 A | 9/2002 |
| KR | 2004-0003738 A | 1/2004 |
| KR | 20040018963 A | 4/2004 |
| TW | 533617 B | 5/2003 |
| WO | 2002/073717 A1 | 9/2002 |
| WO | 2004/008560 A2 | 1/2004 |
| WO | 2005/055344 A2 | 6/2005 |
| WO | 2005/114768 A1 | 12/2005 |
| WO | 2006/027925 A2 | 3/2006 |
| WO | 2006/114047 A1 | 11/2006 |

OTHER PUBLICATIONS

International Search Report, PCT/KR2008/00305, dated Apr. 29, 2008.
Office Action from corresponding Chinese Patent Application No. 200880002550 on Dec. 16, 2010.
Extended European Search Report issued in the corresponding European Patent Application No. 08704841.9 on Jan. 19, 2011.

* cited by examiner

*Primary Examiner* — Jennifer Michener
*Assistant Examiner* — Monique Wills
(74) *Attorney, Agent, or Firm* — Lerner, David, Littenberg, Krumholz & Mentlik, LLP

(57) ABSTRACT

Disclosed are a cathode active material and a secondary battery including the same, wherein the cathode active material includes (a) a first lithium-containing metal composite oxide and (b) a second lithium-containing metal composite oxide coated on an entire particle surface of the first lithium-containing metal composite oxide particle, the second lithium-containing metal composite oxide having a higher resistance and a lower potential vs. lithium potential (Li/Li+) than the first lithium-containing metal composite oxide.

11 Claims, 5 Drawing Sheets

CATHODE ACTIVE MATERIAL AND SECONDARY BATTERY COMPRISING THE SAME

CROSS REFERENCE TO RELATED APPLICATIONS

The present application is a continuation of application Ser. No. 12/523,392 which is a national phase entry under 35 U.S.C. §371 of International Application No. PCT/KR2008/000305, filed Jan. 18, 2008, which claims priority from Korean Patent Application No. 10-2007-0005568, filed Jan. 18, 2007 and Korean Patent Application No. 10-2007-0022440, filed Mar. 7, 2007. The disclosures of said applications are incorporated by reference herein.

TECHNICAL FIELD

The present invention relates to a cathode active material and a secondary battery comprising the same, which can suppress the temporary flow of a large amount of electrons and lithium ions during an internal short, thereby improving safety.

BACKGROUND ART

Recently, as electronic devices have been miniaturized, and lightened, and portable electronic devices have been widely used, research on a lithium secondary battery of high energy density has been actively performed. In a lithium secondary battery, materials allowing intercalation and deintercalation of lithium ions are used as an anode and a cathode, and organic electrolyte or polymer electrolyte is charged between the cathode and the anode. Also, when lithium ions are intercalated and deintercalated at the cathode and the anode, oxidation/reduction reactions generate electrical energy.

In a lithium secondary battery, a lithium-containing metal composite oxide having a high potential vs. lithium potential (Li/Li$^+$) (for example, LiCoO$_2$) has been mainly used as a cathode active material, and a carbonaceous material has been mainly used as an anode active material. Such materials enable the lithium secondary battery to have high capacity and high power. However, when the above described cathode active material having a high potential vs. lithium potential (Li/Li$^+$) is used alone, electrons and lithium ions suddenly move from an anode to a cathode during an internal short caused by internal/external conditions. Accordingly, a large amount of current temporarily flows, and thus heat is suddenly generated within the battery, thereby causing fire or explosion of the battery.

In addition, when the cathode active material is exposed at a high temperature atmosphere or a battery temperature is increased by an abnormal operation of a battery, the cathode active material is decomposed at temperatures higher than a certain temperature, and thus generates oxygen. Accordingly, fire or explosion may occur in the battery. Also, when side reactions occur by contacting the cathode active material with nonaqueous electrolyte, an exothermic reaction may cause an explosion. Especially, when gas is generated within the battery due to the side reactions, the possibility of battery explosion is increased.

DISCLOSURE OF THE INVENTION

Therefore, the present inventors found that when an entire surface of a first lithium-containing metal composite oxide is coated with a second lithium-containing metal composite oxide having a higher resistance and a lower potential vs. lithium potential than the first lithium-containing metal composite oxide, during an internal short, it is possible to slow down the moving rate of a large amount of lithium ions and electrons from an anode to a cathode, and thus to prevent heat generation caused by the temporary occurrence of over-current, and to improve safety of a battery. Accordingly, the surface of the first cathode active material is stabilized, and thus it is possible to increase the temperature where the first cathode active material is decomposed. Also, since the first cathode active material is not in contact with electrolyte, the side reactions are inhibited, and the ignition temperature is increased. Therefore, it is possible to improve thermal stability of a battery.

According to an aspect of the present invention, there is provided a cathode active material comprising (a) a first lithium-containing metal composite oxide and (b) a second lithium-containing metal composite oxide coated on an entire particle surface of the first lithium-containing metal composite oxide, the second lithium-containing metal composite oxide having a higher resistance and a lower potential vs. lithium potential (Li/Li$^+$) than the first lithium-containing metal composite oxide.

According to another aspect of the present invention, there is provided a secondary battery comprising a cathode, an anode, electrolyte, and a separator, the cathode comprising the cathode active material.

Reference will now be made in detail to the exemplary embodiments of the present invention.

The present invention is characterized by a first lithium-containing metal composite oxide of which the entire surface is coated with a second lithium-containing metal composite oxide, wherein the second lithium-containing metal composite oxide has a lower potential vs. lithium potential (Li/Li$^+$) and a higher resistance than the first lithium-containing metal composite oxide.

According to experimental examples, at a discharge rate of less than 5 C, a first lithium-containing metal composite oxide, the entire surface of which is coated with a second lithium-containing metal composite oxide of a high resistance value, shows a similar discharge graph to an uncoated first lithium-containing metal composite oxide (see FIGS. 4 and 5). On the other hand, when the current rate is suddenly increased up to more than 5 C, the coated first lithium-containing metal composite oxide shows a different discharge graph from the uncoated first lithium-containing metal composite oxide (see FIGS. 6~8). In other words, at a discharge rate of less than 5 C, when a first lithium-containing metal composite oxide (which is firstly reduced due to a high potential vs. lithium potential Li/Li$^+$) is discharged, a second lithium-containing metal composite oxide having a high resistance value does not act as a significant internal resistance, and on the other hand, at a discharge rate of more than 5 C, when the first lithium-containing metal composite oxide is discharged, the second lithium-containing metal composite oxide having a high resistance value acts as a significant internal resistance.

During a discharge process, lithium ions are intercalated in a cathode active material, and herein, the cathode active material is reduced by receiving electrons. Also, during a discharge process including an internal short, a potential of a cathode is decreased, and lithium ions (Li$^+$) and electrons are firstly intercalated in a first lithium-containing metal composite oxide having a higher potential than a second lithium-containing metal composite oxide.

In the present invention, an entire surface of a first lithium-containing metal composite oxide is coated with a second lithium-containing metal composite oxide having a lower potential vs. lithium potential and a higher resistance than the first lithium-containing metal composite oxide. Therefore, during a high-rate discharge, such as an internal short, the second lithium-containing metal composite oxide acts as a significant electric resistance layer, and suppresses the inflow of electrons into the core of the first lithium-containing metal composite oxide having a high potential vs. lithium potential, thereby inhibiting the intercalation of lithium ions. In other words, during an internal short, it is possible to slow down the intercalation rate of a large amount of lithium ions and electrons from an anode to a cathode, and thus to prevent heat generation caused by the temporary occurrence of over-current, thereby improving the safety of a battery.

If only a part of the surface of a first lithium-containing metal composite oxide is coated with the second lithium-containing metal composite oxide, lithium ions and electrons may be intercalated in the first lithium-containing metal composite oxide through the uncoated surface. Accordingly, it is impossible to slow down the intercalation rate of lithium ions and electrons. Also, since a narrow surface, through which lithium ions and electrons pass, causes a nozzle effect, a moving rate of lithium ions and electrons is increased. Therefore, heat is locally generated, and thus may reduce the safety of a battery (see FIG. 3).

Conventionally, in order to adjust a discharge potential of a cathode within a certain range, an electrode in which cathode active materials of different potentials vs. lithium potential ($Li/Li^+$) are included has been used as a cathode for a lithium secondary battery. However, when an internal short occurs, for the same reason described above, there has been a problem in that fire or explosion of a battery may suddenly occur.

Meanwhile, in the present invention, since the surface of a first lithium-containing metal composite oxide is uniformly coated with a second lithium-containing metal composite oxide of a high potential difference and a high resistance, it is possible to maximize a resistance function and thus to suppress the flow of lithium ions when over-current flows.

Contrary to an electrochemically irreversible electrode additive, which has been conventionally used for a specific effect, a cathode active material according to the present invention includes a second lithium-containing metal composite oxide capable of intercalating and deintercalating lithium. Accordingly, there are very few problems of performance degradation of a battery (such as, degradation of capacity, a lifetime property, etc.) which has been conventionally caused by an electrode additive not concerned in the electrochemical reactions in a battery. In addition, since a first lithium-containing metal composite oxide having a high potential vs. lithium potential, and a second lithium-containing metal composite oxide having a relatively low potential vs. lithium potential, are used as a large amount of core material and a small amount of coating material, respectively, the first lithium-containing metal composite oxide having a high drive voltage and high energy density can act as a main cathode active material.

Also, in the present invention, although a cathode active material includes a much smaller amount of second lithium-containing metal composite oxide than a different cathode active material in which a first lithium-containing metal composite oxide and a second lithium-containing metal composite oxide are simply mixed with each other, it is possible to achieve the same or an even higher level of improved safety as the different cathode active material. Accordingly, it is possible to reduce the degradation of electrochemical properties, which may be caused by an excessive amount of a second lithium-containing metal composite oxide.

Also, in the cathode active material according to the present invention, the surface of a first lithium-containing metal composite oxide is completely covered with a second lithium-containing metal composite oxide. Accordingly, the surface energy of the first lithium-containing metal composite oxide is lowered and stabilized, and thus it is possible to increase a exothermic temperature where the first lithium-containing metal composite oxide is decomposed and generates oxygen. Also, it is possible to improve thermal stability by inhibiting side reactions of the first lithium-containing metal composite oxide and electrolyte.

The range of a potential difference vs. lithium potential between the first lithium-containing metal composite oxide and the second lithium-containing metal composite oxide is not particularly limited. However, the first lithium-containing metal composite oxide preferably has a potential of 3.7 V or more ($Li/Li^+$) in such a manner that oxidation/reduction reactions of the first lithium-containing metal composite oxide can be performed at a relatively high potential. Also, the second lithium-containing metal composite oxide preferably has a potential vs. lithium potential of less than 3.7 V ($Li/Li^+$), which is relatively lower than that of the first lithium-containing metal composite oxide. Herein, the range of a potential difference vs. lithium potential ($Li/Li^+$, $\Delta P$) between the first lithium-containing metal composite oxide and the second lithium-containing metal composite oxide is within a range of $0.3\ V<\Delta P<5\ V$, and more preferably within a range of $0.3V<\Delta P<3.5V$, but is not limited to this range.

An electric resistance of an object varies according to the shape, the size, and the way of current flow (even in the case of objects using the same material). For example, when the constant current flows between a couple of opposite surfaces of a 1 $m^3$ cube, V is represented by $V=\rho \cdot I$ according to Ohm's law (herein, V represents the voltage between the surfaces, I represents the current, and $\rho$ represents the resistivity). The resistivity is expressed in $\Omega \cdot m$ (as an MKSA unit). When an object has a cross sectional area of $Sm^2$, and a length of Lm, the resistance R is represented by $R=\rho \cdot L/S$.

In the present invention, it is possible to adjust the resistance value ($R_2$) of a second lithium-containing metal composite oxide, by adjusting a coated thickness (L) and a specific surface area (S) of the second lithium-containing metal composite oxide. Accordingly, the second lithium-containing metal composite oxide may not function as an internal electric resistance layer during a normal discharge, but may function as an internal electric resistance layer during a high-rate discharge more than a certain value (for example, 5 C). For example, as the coated thickness (L) and the specific surface area (S) are thicker and smaller, respectively, the second lithium-containing metal composite oxide has a higher resistance value ($R_2$). The specific surface area is adjusted by adjusting the size of the second lithium-containing metal composite oxide.

When the resistance value ($R_2$) of the second lithium-containing metal composite oxide is increased, the current value (I) passing through the coated layer of the second lithium-containing metal composite oxide is decreased because of $V=IR$ (V: voltage, I: current, and R: resistance). Therefore, when heating value (Q/t=VI, Q=heating value, t=time) per unit time (t) is decreased in the core particle of a first lithium-containing metal composite oxide, the safety of a battery can be improved.

The range of a current rate, in which a coated layer of the second lithium-containing metal composite oxide acts as a significant electric resistance layer, is not limited as long as the current is out of the range of a normal battery operation. For example, the range may be 5 C or more.

Further, a resistance difference between a first lithium-containing metal composite oxide and a second lithium-containing metal composite oxide may be represented in the electrical conductivity ratio of the second lithium-containing metal composite oxide to the first lithium-containing metal composite oxide. Herein, the electrical conductivity ratio preferably has a range of $10^{-1} \sim 10^{-7}$, and more preferably has a range of $10^{-1} \sim 10^{-3}$, but is not limited to this. When the resistance difference between the two materials has a large value, the battery safety is improved, but the battery performance may be reduced, and on the other hand, when the resistance difference has a small value, it is difficult to achieve a desired effect of the present invention. Since during an internal short (that is, discharge), lithium ions prefer to be intercalated in the first lithium-containing metal composite oxide having higher potential, the second lithium-containing metal composite oxide coated on the first lithium-containing metal composite oxide inevitably acts as a resistance.

Also, when the electrical conductivity ratio of the second lithium-containing metal composite oxide to the first lithium-containing metal composite oxide is less than the above described range, (that is, the resistance difference is large), it is possible to coat the surface of the second lithium-containing metal composite oxide with a conductive material (for example, a carbonaceous material, etc.) in order to adjust the ratio to the above described range.

Non-limiting examples of the first lithium-containing metal composite oxide that may be used in the present invention include $LiMO_2$(M=Co, Mn, Ni, $Ni_{1/3}Co_{1/3}Mn_{1/3}$, Cr, V), $LiMo_4$(M=CoMn, NiV, CoV, CoP, MnP, NiP, $Mn_2$) and a mixture of the materials, and non-limiting examples of the second lithium-containing metal composite oxide include $LiMo_4$(M=$V_2$, FeP), $LiMo_2$(M=Mn, Mo, W), $LiV_6O_{13}$, $LiTiS_2$, $LiWO_2$ and a mixture of the materials. In addition, a reversible compound capable of intercalating and deintercalating lithium, which has a potential difference and a resistance ratio as described above, thereby improving the safety of a battery, may be used in the present invention.

In the cathode active material according to the present invention, it is preferable that particles of a second lithium-containing metal composite oxide having a relatively low potential vs. lithium potential and a high resistance are covered on the entire surface of a first lithium-containing metal composite oxide (see FIG. 1). In order to obtain such a cathode active material, the surface area, size, and usage rate of a first lithium-containing metal composite oxide and a second lithium-containing metal composite oxide are required to be adjusted. A cathode according to the present invention will be obtained by adjusting the surface area, size, and usage rate of a second lithium-containing metal composite oxide.

For example, in order to coat a first lithium-containing metal composite oxide particle having a particle size of 20 μm, a second lithium-containing metal composite oxide (particle size: 5 μm) is required to be used in an amount of about 20 wt %. On the other hand, when a particle size of a second lithium-containing metal composite oxide is 2.5 μm, the first lithium-containing metal composite oxide may be completely coated with an amount of 7.5 wt % of the second lithium-containing metal composite oxide.

Therefore, in the present invention, in order to obtain a cathode active material having a coated surface as described above, the surface area, particle size, and usage rate of the second lithium-containing metal composite oxide may be appropriately adjusted within a conventional range known to one skilled in the art. Herein, the weight ratio of the first lithium-containing metal composite oxide to the second lithium-containing metal composite oxide is preferably within the range of 70:30~97.5:2.5, but is not limited to this. When the weight ratio is less than the above range, electrochemical performance may be reduced. On the other hand, when the weight ratio is more than the above range, the second lithium-containing metal composite oxide cannot sufficiently act as a resistance, and thus the safety of a battery cannot be improved.

However, when there is a large difference between specific surface areas of the first lithium-containing metal composite oxide and the second lithium-containing metal composite oxide, it is possible to achieve the same effect as that of the above described range although the weight ratio is smaller than that of the range. Also, contrary to simply blended two active materials in which the weight ratio is required to be increased due to unmixed and conglomerated particles, when the surface of either particle is coated with another material as in the present invention, it is possible to achieve the same effect as that of the above described range although the weight ratio is smaller than that of the range.

As described above, in order to coat the surface of a first lithium-containing metal composite oxide with a second lithium-containing metal composite oxide, it is preferable that the first lithium-containing metal composite oxide has a particle size within the range of 5 μm~30 μm, and the second lithium-containing metal composite oxide has a particle size within the range of 30 nm~5 μm. Also, it is preferable that the first lithium-containing metal composite oxide has a specific surface area within the range of 0.01~0.2 $m^2/g$, and the second lithium-containing metal composite oxide has a specific surface area within the range of 0.5~30 $m^2/g$. But, the particle size and the specific area are not limited to the above described ranges.

For example, in the case of $LiCoO_2$ used as a first lithium-containing metal composite oxide, the particle size may be within the range of 10~20 μm, the electrical conductivity may be about $10^{-2}$ S/cm, and the specific surface area may be about 0.2 $m^2/g$. As a second lithium-containing metal composite oxide to be coated on the surface of the above described particle, $LiMnO_4$, $Li(Ni_{1/3}Mn_{1/3}Co_{1/3})O_2$, $LiFePO_4$, etc. may be used. In the case of $LiFePO_4$ used as a second lithium-containing metal composite oxide, the particle size may be within the range of 0.5~5 μm, the electrical conductivity may be about $10^{-4} \sim 10^{-9}$ S/cm, and the specific surface area may be about 0.5~13 $m^2/g$. When the whole or partial surface of $LiFePO_4$ (the second lithium-containing metal composite oxide) is coated with a carbonaceous material, the conductivity may be increased up to the range of $10^{-2} \sim 10^{-3}$.

Non-limiting examples of a method of obtaining a cathode active material according to the present invention (in which the surface of a first lithium-containing metal composite oxide is coated with a second lithium-containing metal composite oxide) include jet mill, spray drying, etc. Preferably, a Mechanofusion method may be used, and also, a NOBILTA™ (Hosokawa Micron Corporation), which has better milling power than the Mechanofusion method, may be used.

When a first lithium-containing metal composite oxide and a second lithium-containing metal composite oxide are charged in a Mechanofusion mixer, the materials are mixed by adding mechanical energy and thermal energy at the same time. Accordingly, it is possible to obtain a cathode active material in which the surface of a first lithium-containing metal composite oxide particle is uniformly coated with a second lithium-containing metal composite oxide.

In a Mechanofusion method, when a high striking energy is added to particles, two kinds of particles are fused in such a manner that a base particle is completely surrounded by coating particles. For example, Such a coated particle is obtained by the steps of: fixing both kinds of powder on the inner wall of a rotative container by a centrifugal force; momentarily compacting the powder by an inner member fixed to a center shaft; scraping the powder with a scraper at a high speed; complexing the particles through repeated compacting/scraping(shearing) operation and heat-adhering both kinds of powder by a mechanofusion operation. However, this example is illustrative only, and the scope of the present invention is not limited thereto.

In the present invention, particle hardness of the second lithium-containing metal composite oxide may be lower than that of the first lithium-containing metal composite oxide because, in the process of coating the second lithium-containing metal composite oxide on the surface of the first lithium-containing metal composite oxide by milling the two materials, the second lithium-containing metal composite oxide has to be finely ground so as to be uniformly coated on the surface of the first lithium-containing metal composite oxide. On the other hand, the first lithium-containing metal composite oxide does not have to be ground.

A cathode including the cathode active material according to the present invention is obtained by applying cathode slurry including the cathode active material according to the present invention on a current collector, and drying the applied slurry. Herein, a small amount of conductive material or binder may be optionally added.

Non-limiting examples of a cathode current collector include aluminum, nickel, and foil obtained by combination of aluminum and nickel. As a binder, a conventional binding agent may be used, and non-limiting examples of the binder include PVDF (polyvinylidene fluoride), SBR (styrene butadiene rubber), etc.

The present invention provides a secondary battery including a cathode including a first cathode active material surface-coated with a second cathode active material, an anode, electrolyte, and a separator, the second cathode active material having a relatively low potential and a high resistance.

It is preferable that the secondary battery is a lithium secondary battery, and non-limiting examples of the lithium secondary battery include a lithium metal secondary battery, a lithium ion secondary battery, a lithium polymer secondary battery, a lithium ion polymer secondary battery, etc.

The secondary battery according to the present invention may be obtained by a conventional method known to one skilled in the art in which a porous separator is inserted between a cathode and an anode, and electrolyte is added.

An anode according to the present invention may be obtained by a conventional method known to one skilled in the art, that is, by applying anode slurry including an anode active material on a current collector, and drying the applied slurry. Herein, the anode active material may include a conventional anode active material that may be used in an anode of a conventional secondary battery, and non-limiting examples of the anode active material include lithium metal or lithium alloy, a lithium intercalating material, such as carbon, petroleum coke, activated carbon, graphite, or other carbons, etc.

The electrolyte for the battery includes conventional electrolyte components known to one skilled in the art, that is, electrolyte salts and an organic solvent.

An electrolyte salt that may be used in the present invention includes a salt represented by the formula of $A^+B^-$, wherein $A^+$ represents an alkali metal cation selected from the group including $Li^+$, $Na^+$, $K^+$ and combinations thereof, and $B^-$ represents an anion selected from the group including $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof. A lithium salt is particularly preferred.

As an organic solvent, a conventional solvent known to one skilled in the art, that is, cyclic carbonate and/or linear carbonate, may be used, and non-limiting examples of such carbonate include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate, or a mixture thereof. Halogen derivatives of the above organic solvents may also be used.

There is no particular limitation in the separator that may be used in the present invention, as long as the separator is a porous material. Non-limiting examples of the separator that may be used include a polypropylene-based, polyethylene-based, polyolefin-based porous separator. Porous separators to which inorganic materials are added may also be used.

There is no particular limitation in the outer shape of the secondary battery according to the present invention. The secondary battery may be a cylindrical battery using a can, a prismatic battery, a pouch-type battery or a coin-type battery.

BRIEF DESCRIPTION OF THE DRAWINGS

The foregoing and other objects, features and advantages of the present invention will become more apparent from the following detailed description when taken in conjunction with the accompanying drawings in which:

FIG. 4, FIG. 5, FIG. 6, FIG. 7 and FIG. 8 illustrate the values at the current rates of 1 C, 5 C, 10 C, 20 C, and 30 C, respectively.

BEST MODE FOR CARRYING OUT THE INVENTION

Reference will now be made in detail to the preferred embodiments of the present invention. However, the following examples are illustrative only, and the scope of the present invention is not limited thereto.

EXAMPLE 1

Figure 1:
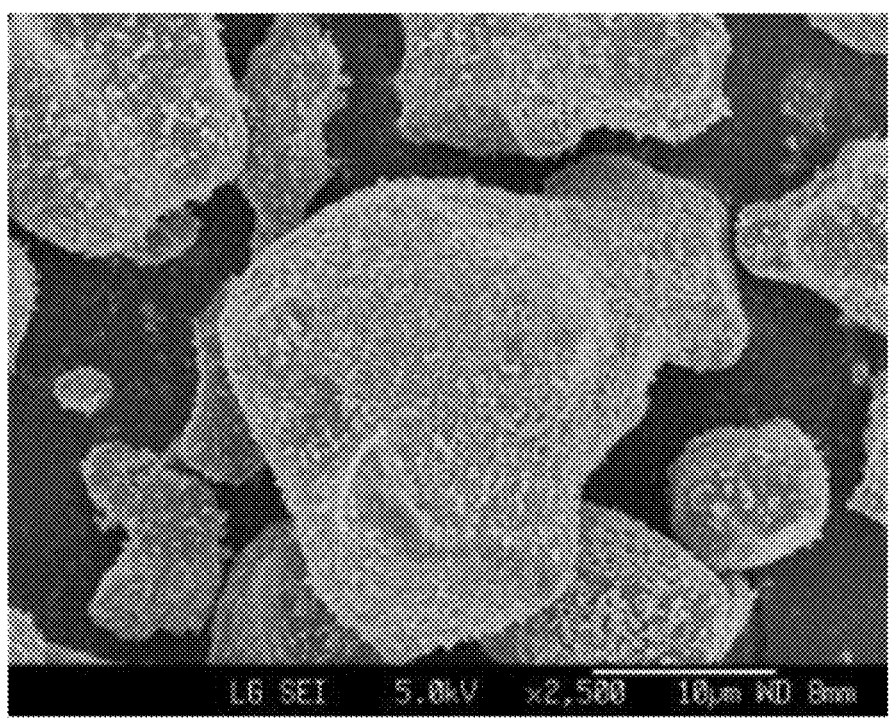
FIG. 1 is a scanning electron microscopy (SEM) picture of an active material $LiCoO_2$ surface-coated with $LiFePO_4$, which is prepared by Example 1.
Figure 2:
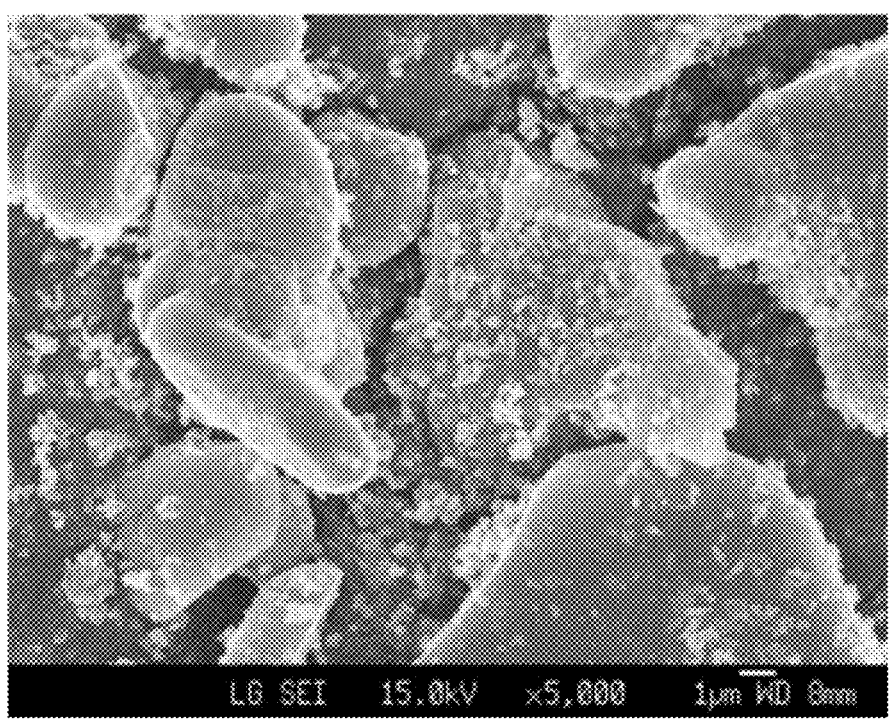
FIG. 2 is a SEM picture of an active material $LiCoO_2$ simply mixed with $LiFePO_4$, which is prepared by Comparative Example 2.
Figure 3:
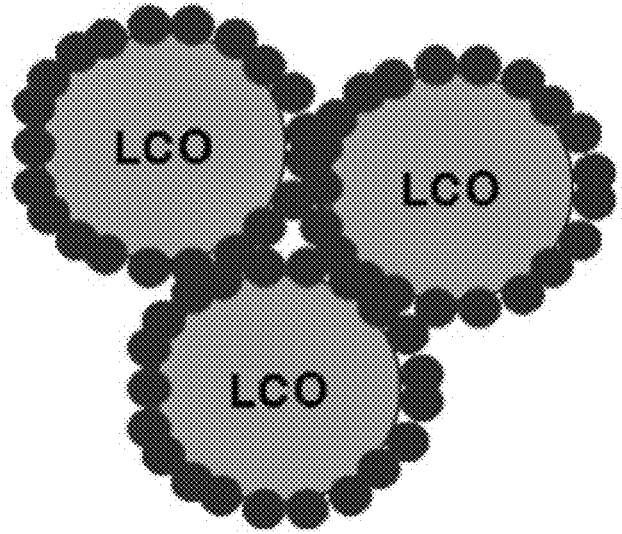
FIG. 3 is a schematic drawing illustrating active materials according to Examples and Comparative Examples.
Figure 3:
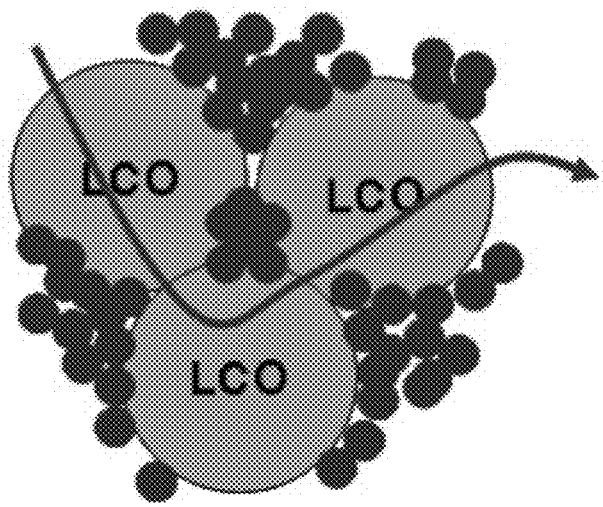
Figure 4:
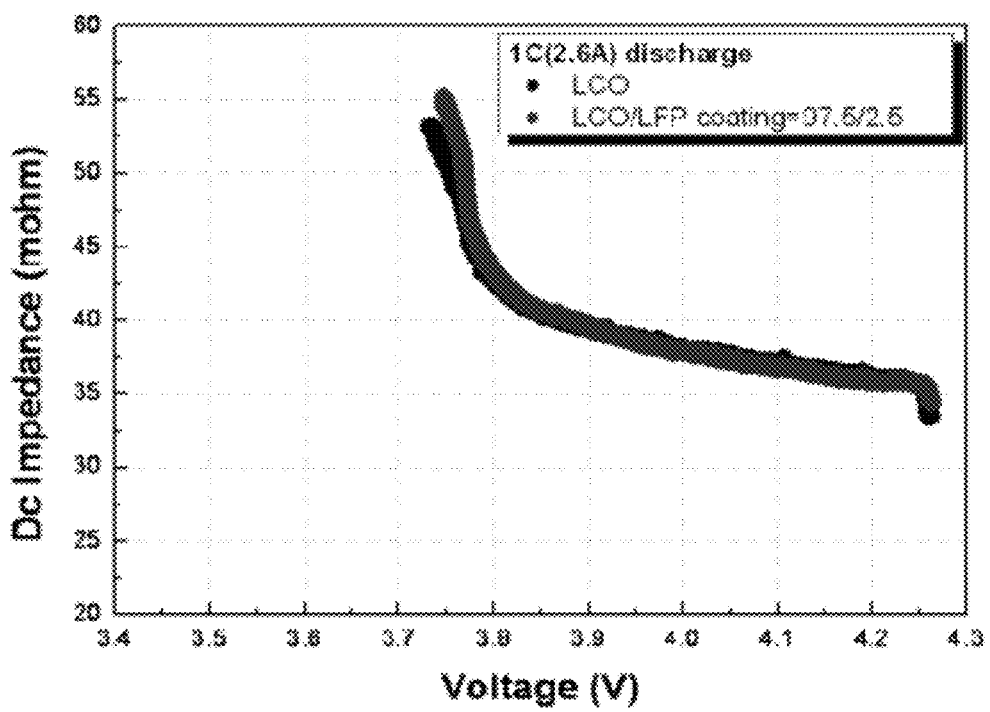
FIGS. 4~8 illustrate DC impedance values of an active material $LiCoO_2$ surface-coated with $LiFePO_4$, which is prepared by Example 4, and DC impedance values of an active material $LiCoO_2$, which is prepared by Comparative Example 1.
Figure 5:
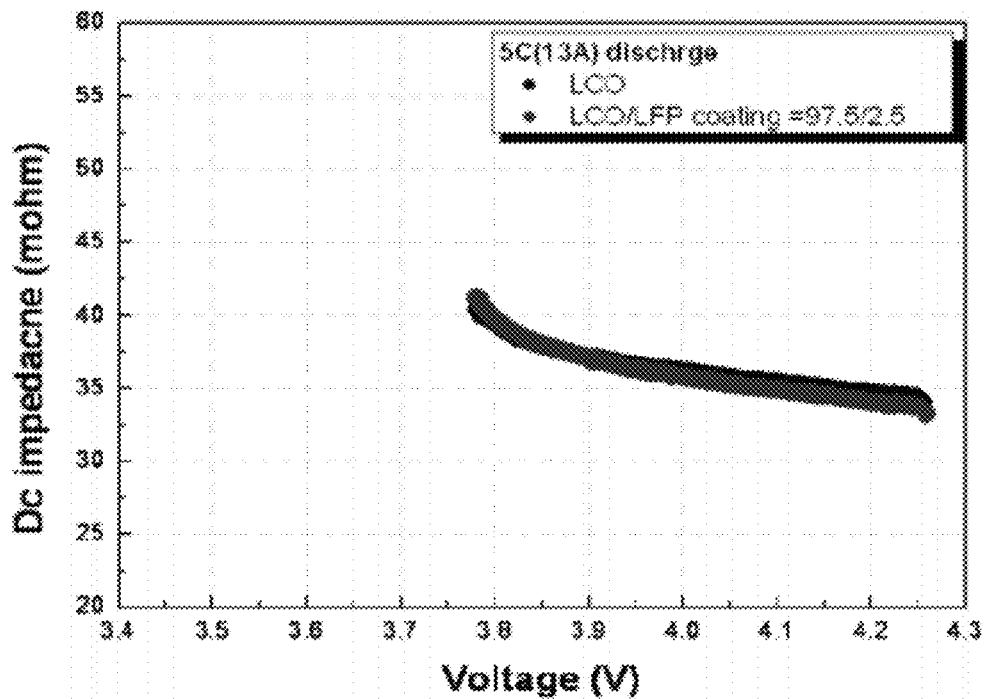
Figure 6:
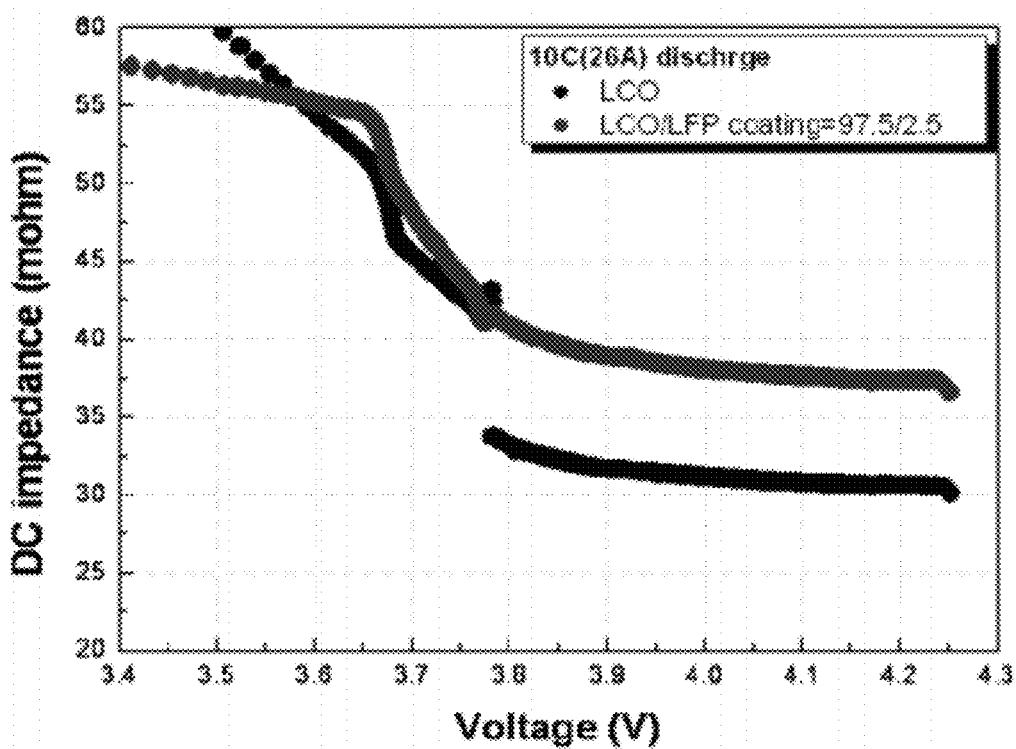
Figure 7:
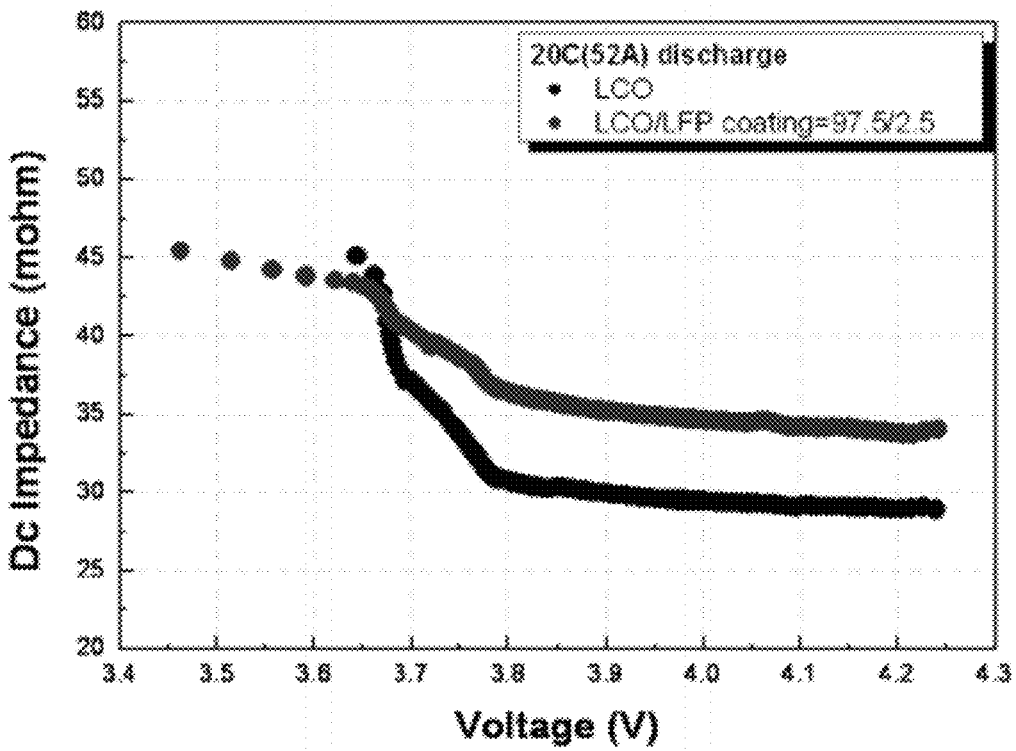
Figure 8:
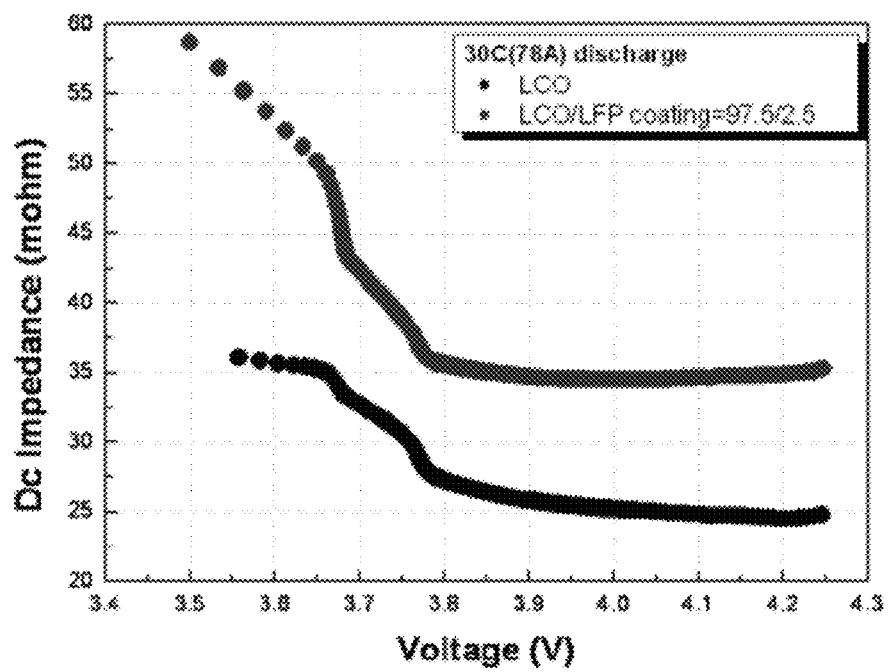
Figure 9:
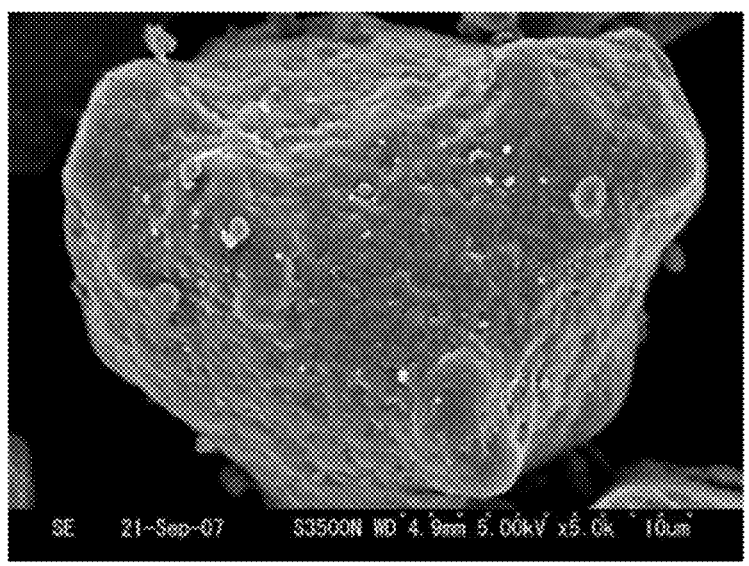
FIG. 9 is a SEM picture of an active material $LiCoO_2$ surface-coated with $LiFePO_4$, which is prepared by Example 5.

$LiCoO_2$ (specific surface area: 0.2 m$^2$/g, $D_{50}$=5~20 μm) and $LiFePO_4$ (specific surface area: 13 m$^2$/g, $D_{50}$=0.5~5 μm)

were mixed in a weight ratio of 97.5:2.5, and the mixture was charged into a mechanofusion mixer. A mechanofusion process was performed for 5~30 minutes to obtain $LiCoO_2$ powder surface-coated with $LiFePO_4$. Although the mechanofuxion process was performed at room temperature, the process inevitably generated considerable amount of heat. So, the coating of $LiFePO_4$ is facilitated by the heat. FIG. 1 shows a scanning electron microscopy (SEM) picture of the obtained powder. Herein, the potential difference vs. lithium potential between the two materials was 0.3V~0.8V, and the electrical conductivity ratio of $LiFePO_4$ to $LiCoO_2$ was $10^{-2}$~$10^{-7}$.

As shown in FIG. 1, fine particles of $LiFePO_4$ are uniformly coated on the surface of $LiCoO_2$ particles.

The coated cathode active material, together with a conductive material and a binding agent, was added in a solvent NMP (N-methyl-2-pyrrolidone), to obtain cathode slurry. Then, a cathode was obtained by coating the cathode slurry on Al current collector.

As an anode active material, a graphite material was used. A binding agent was added in NMP to obtain anode slurry. Then, an anode was obtained by coating the anode slurry on Cu current collector.

As electrolyte, EC/EMC (ethyl carbonate/ethyl methyl carbonate, volumetric ratio 1:2) solution containing 1M $LiPF_6$ dissolved therein was used. A polyolefin-based separator was inserted between the obtained cathode and anode, and then the electrolyte was charged to obtain a battery.

EXAMPLE 2

A cathode active material and a battery were obtained in the same manner as described in Example 1, except that $LiCoO_2$ and $LiFePO_4$ were mixed in a weight ratio of 95:5 instead of 97.5:2.5.

EXAMPLE 3

A cathode active material and a battery were obtained in the same manner as described in Example 1, except that $LiCoO_2$ and $LiFePO_4$ were mixed in a weight ratio of 90:10 instead of 97.5:2.5.

EXAMPLE 4

A cathode active material and a battery were obtained in the same manner as described in Example 1, except that $LiCoO_2$ and $LiFePO_4$ were mixed in a weight ratio of 85:15 instead of 97.5:2.5.

EXAMPLE 5

A cathode active material and a battery were obtained in the same manner as described in Example 1, except that a NOBILTA™ (Hosokawa Micron Corporation) was performed instead of a mechanofusion method.

COMPARATIVE EXAMPLE 1

A cathode active material and a battery were obtained in the same manner as described in Example 1, except that $LiCoO_2$ was used alone as a cathode active material.

COMPARATIVE EXAMPLE 2

A cathode active material and a battery were obtained in the same manner as described in Example 3 ($LiCoO_2$:$LiFePO_4$=90:10), except that $LiCoO_2$ and $LiFePO_4$ were simply mixed by a ball mill process, instead of a mechanofusion process.

COMPARATIVE EXAMPLE 3

A cathode active material and a battery were obtained in the same manner as described in Example 1, except that $LiNi_{0.9}Co_{0.1}O_2$ (specific surface area: 0.4 $m^2$/g, $D_{50}$=10μm), instead of $LiFePO_4$, was coated on the surface of $LiCoO_2$ via a mechanofusion process.

Herein, the potential difference vs. lithium potential between the two materials was −0.2V~0.5V, and the electrical conductivity ratio of $LiNi_{0.9}Co_{0.1}O_2$ to $LiCoO_2$ was 1.

When the secondary battery according to Comparative Example 3 was used, the safety of a battery cannot be improved due to an inappropriate resistance ratio.

EXPERIMENTAL EXAMPLE 1

Determination on the Safety of a Battery

On each of the secondary batteries according to Examples 1~4 and the batteries according to Comparative Examples 1~3, a nail penetration test was performed with voltage of 4.2V at 60° C.

As noted in Table 1, batteries according to Comparative Examples 1~3 caused fire, and on the other hand, batteries according to Examples 1~4 did not cause fire or explosion, and maintained safety. Therefore, although an internal short was caused by an external impact, it is possible to significantly reduce the momentary movement of a large amount of lithium ions, and the flow of current, from an anode to a cathode. In other words, heat accumulation of a battery, which is caused by the flow of current, is reduced, thereby suppressing sudden fire or explosion of a battery.

TABLE 1

|  | 0.3 m/min | 1 m/min | 3 m/min |
|---|---|---|---|
| Exp. 1 | Pass (0/3) | Pass (0/3) | Pass (0/3) |
| Exp. 2 | Pass (0/3) | Pass (0/3) | Pass (0/3) |
| Exp. 3 | Pass (0/3) | Pass (0/3) | Pass (0/3) |
| Exp. 4 | Pass (0/3) | Pass (0/3) | Pass (0/3) |
| Comp. Exp. 1 | Fail (3/3) | Fail (3/3) | Fail (3/3) |
| Comp. Exp. 2 | Fail (3/3) | Fail (3/3) | Fail (3/3) |
| Comp. Exp. 3 | Fail (3/3) | Fail (3/3) | Fail (3/3) |

EXPERIMENTAL EXAMPLE 2

Determination on the Resistance of a Battery

On each of the secondary battery according to Example 1 and the battery according to Comparative Example 1, an internal resistance (DC impedance) was measured by changing the current rate into 1 C, 5 C, 10 C, 20 C, and 30 C.

Based on the test results, as the current rate is increased, the difference in DC impedance between $LiCoO_2$ surface-coated with $LiFePO_4$ and uncoated $LiCoO_2$ gets larger (see FIGS. 4~8). Accordingly, it is determined that during discharge, LiFePO$_4$ acting as a second lithium-containing metal composite oxide functions as a resistance.

Therefore, it is determined that during a discharge of 5 C or more (for example, an internal short of a battery) in which the resistance difference of two or more kinds of cathode active materials occurs, the moving rate of a large amount of lithium ions and electrons from an anode to a cathode is decreased, thereby preventing the heat generation caused by the sudden occurrence of over current, thus improving the safety of a battery.

EXPERIMENTAL EXAMPLE 3

Determination on the Thermal Stability of a Battery

The thermal stability of a battery was determined by using Differential Scanning calorimetry (DSC), and the performance of a battery was determined by manufacturing a coin half cell.

TABLE 2

| | | Comp. Exp. 1 | Exp. 1 | Comp. Exp. 2 |
|---|---|---|---|---|
| Sample weight (mg) | | 9.0 | 9.0 | 9.0 |
| Relative weight (%) of LiCoO$_2$ | | 100 | 97.5 | 90 |
| Heat value (J/g) | | 384.2 | 356.6 | 385 |
| Reversible capacity (charge/ discharge) (mAh/g) | 0.1 C | 147.3 | 145.5 | 138.6 |
| | 0.2 C | 146.0 | 143.0 | 136.0 |
| | 0.2 C/ 0.1 C | 99.1 | 98.3 | 98.1 |
| | 0.5 C | 142.1 | 139.0 | 131.7 |
| | 0.5 C/ 0.1 C | 96.5 | 95.5 | 95.1 |
| | 1 C | 136.4 | 132.3 | 125.8 |
| | 1 C/0.1 C | 92.6 | 90.9 | 90.8 |
| | 1.5 C | 132.8 | 129.1 | 120.1 |
| | 1.5 C/ 0.1 C | 90.2 | 88.7 | 86.7 |
| | 2 C | 122.1 | 118.4 | 105.1 |
| | 2 C/0.1 C | 82.9 | 81.3 | 75.8 |

Based on the heat values as noted in Table 2, a surface-coated sample according to Example 1 has a lower value than an uncoated sample according to Comparative Example 1. Therefore, it is determined that the thermal stability of an active material of the battery according to Example 1 is better. On the other hand, the thermal stability of the battery according to Comparative Example 2, which is simply mixed sample, is not good.

Also, as noted in Table 2, at a low-rate, a surface-coated sample according to Example 1 shows similar performance to an uncoated sample according to Comparative Example 1. Therefore, it is determined that an active material according to the present invention may improve the stability while minimizing the reduction of battery performance. On the other hand, in the case of simply mixed sample according to Comparative Example 2, since the content of LiCoO$_2$ is decreased, the loss of capacity is unavoidable.

In the case of high-rates such as 5 C, 10 C, 30 C, etc. (not noted in Table 2), as shown in FIGS. 4~8, since the resistance is increased, the performance of a battery is reduced and the moving rate of electrons and lithium ions is reduced. Therefore, it is possible to improve the safety at the occurrence of over current.

Industrial Applicability

In the present invention, an entire surface of a first lithium-containing metal composite oxide is coated with a second lithium-containing metal composite oxide having a high resistance value and a low potential vs. lithium potential. Therefore, during an internal short of a secondary battery, it is possible to slow down the moving rate of a large amount of lithium ions and electrons from an anode to a cathode, and thus to prevent heat generation caused by the occurrence of temporary over-current. Also, it is possible to increase the temperature where a cathode active material is decomposed and gas is generated, and to improve thermal stability by inhibiting side reactions of the cathode active material and electrolyte.

Also, since the second lithium-containing metal composite oxide is coated on the entire surface of the first lithium-containing metal composite oxide, a small amount of second lithium-containing metal composite oxide is required. Accordingly, it is possible to minimize the degradation of battery capacity and performance.

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

The invention claimed is:

1. A cathode active material comprising:
   (a) a first lithium-containing metal composite oxide; and
   (b) a coating layer comprising a second lithium-containing metal composite oxide coated on an entire surface of the first lithium-containing metal composite oxide particle, the coating layer being free from a carbonaceous material,
   wherein the second lithium-containing metal composite oxide having a higher resistance and a lower potential vs. lithium potential (Li/Li$^+$) than the first lithium-containing metal composite oxide, and
   wherein the first lithium-containing metal composite oxide has a specific surface area within a range of 0.01~0.2 m$^2$/g, and the second lithium-containing metal composite oxide has a specific surface area within a range of 0.5~30 m$^2$/g.

2. The cathode active material according to claim 1, wherein the first lithium-containing metal composite oxide has a potential vs. lithium potential of 3.7V or more (Li/Li$^+$), and the second lithium-containing metal composite oxide has a potential vs. lithium potential of less than 3.7V (Li/Li$^+$).

3. The cathode active material according to claim 1, wherein a potential difference vs. lithium potential (ΔP) between the first lithium-containing metal composite oxide and the second lithium-containing metal composite oxide is within a range of 0.3V<ΔP<5V.

4. The cathode active material according to claim 1, wherein an electrical conductivity ratio of the second lithium-containing metal composite oxide to the first lithium-containing metal composite oxide is within a range of $10^{-1}$~$10^{-7}$.

5. The cathode active material according to claim 1, wherein a weight ratio of the first lithium-containing metal composite oxide to the second lithium-containing metal composite oxide is within a range of 70:30~97.5:2.5.

6. The cathode active material according to claim 1, wherein the first lithium-containing metal composite oxide has a particle size within a range of 5~30 μm, and the second lithium-containing metal composite oxide has a particle size within a range of 30 nm~5 μm.

7. The cathode active material according to claim 1, wherein the first lithium-containing metal composite oxide particle is selected from the group consisting of LiMO$_2$ (M=Co, Mn, Ni, Ni$_{1/3}$Co$_{1/3}$Mn$_{1/3}$, Cr, V) and LiMO$_4$ (M=CoMn, NiV, CoV, CoP, MnP, NiP, or $Mn_2$), and the second lithium-containing of $LiMO_4$ (M=$V_2$, OR FeP), $LiMO_2$ (M=Mn, Mo, or W), $LiV_6O_{13}$, $LiTiS_2$, and $LiWO_2$.

8. The cathode active material according to claim 1, wherein the second lithium-containing metal composite oxide has a lower particle hardness than the first lithium-containing metal composite oxide.

9. A secondary battery comprising a cathode, an anode, electrolyte, and a separator, wherein the cathode comprises the cathode active material according to claim 1.

10. The secondary battery according to claim 9, wherein during a discharge of 5 C or more, a moving rate of a large amount of lithium ions and electrons, which is suddenly transferred from said anode to said cathode, is adjusted to slowed down, thereby preventing fire occurrence of the battery.

11. The secondary battery according to claim 9, wherein the secondary battery is a lithium secondary battery.

* * * * *